Patented Dec. 4, 1934

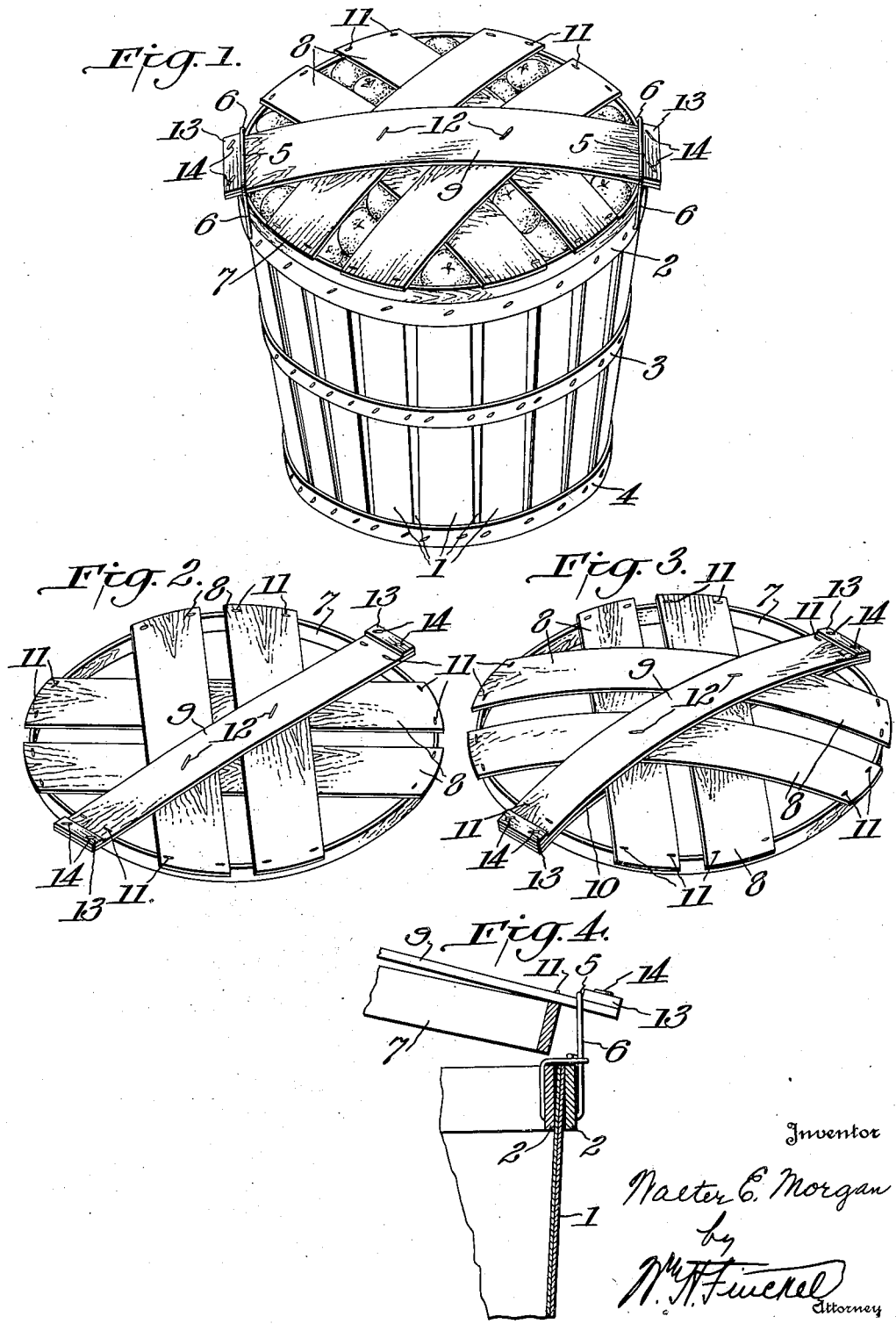

1,983,479

UNITED STATES PATENT OFFICE 1,983,479

RETAINER FOR BASKET COVERS

Walter E. Morgan, Dayton, Tenn., assignor to Dayton Veneer & Lumber Mills, Dayton, Tenn., a corporation of Tennessee Application December 20, 1933, Serial No. 703,287

6 Claims. (Cl. 217—124)

In the type of basket covers wherein an exterior slat known as a "handle slat" has its ends extended through the customary basket handles, usually in the form of wire loops, to hold the cover in desired position upon the basket, it sometimes happens that, due to the upward bulging of the cover caused by the contents of the basket, the ends of the slat are withdrawn from the basket handles and the cover consequently becomes displaced or disengaged.

Various wire and other types of fastening devices applied to the cover and basket, or to the cover slat and basket handles, have been employed for correcting this condition, but all such devices consume time for their application and attachment, require extra assembly operations, and hence entail considerable additional expense not only as regards the furnishing of the devices themselves but as to their application to the baskets and covers and the operation of properly engaging or connecting them when the basket cover is properly positioned upon the basket.

The object of the present invention is to provide a retainer for basket covers of the general type referred to which is simple and cheap in its nature and mode of application and which, moreover, requires no attaching operation when the cover is applied to the basket, but acts automatically to prevent withdrawal of the slat ends from the basket handles in the presence of pressure exerted within the basket.

The invention consists in providing the ends of the handle slat of a basket cover with means which will abut against the basket handles, through which the slat ends have been passed, upon the occurrence of outward pressure upon the cover sufficient to tend to withdraw the slat ends from the handles, as will be explained hereinafter more fully, and finally claimed.

In the accompanying drawing illustrating the invention, in the several figures of which like parts are similarly designated, Figure 1 is a perspective view of a packed basket having a cover embodying the retainer of the invention. Fig. 2 is a cover of the "flat" type provided with the retainer of the invention; and Fig. 3 is a cover of the "crown" type similarly provided. Fig. 4 is an enlarged fragmentary sectional elevation illustrating the operation of the cover retainer of the invention.

The basket illustrated in Figs. 1 and 4 is of the usual stave type, the staves 1 of which are secured in the customary manner by hoops 2, 3 and 4 stapled or otherwise fastened, as shown. As usual in baskets of this kind, the inner and outer top hoops 2 have applied to them, at diametrically opposite points of the open top of the basket, handles in the form of loop members, usually of wire, as shown, and each comprising a top reach 5 and spaced arms 6 connected with the top reach and with the basket sides.

The cover, whether of the "flat" or "crown" type (Figs. 2 and 3, respectively) includes a hoop 7, crossed slats 8 and a handle slat 9. In the "crown" cover, Fig. 3, the handle slat 9 is reinforced by a complemental slat 10 and the slats 9 and 10 embrace the crossed slats 8 between them. As will be seen, all of the slats 8, 9 and 10 are stapled or otherwise secured to the hoops 7 as indicated at 11, and the mid portions of the handle slats 9 and 10 are stapled or otherwise secured to the crossed slats 8, as indicated at 12.

As is customary, the ends of the handle slat 9 project beyond or overhang the margin of the cover as defined by the hoop 7 and may be passed through the basket handles to hold the cover against rotation upon the basket and to prevent it from becoming disengaged therefrom. But in order that pressure from within the basket, due to the bulge caused by the packed articles, fruit for example, may not withdraw the slat ends from the basket handles, as has happened when the handle slat becomes unduly flexed or distorted, the ends of this slat are provided with means, shown as transverse battens 13, projecting or upstanding from the upper surface of the slat and adapted for abutting engagement with the outwardly facing portions of the reaches 5 of the basket handles.

The battens 13 are preferably made from veneer strips, similar to the slats and other parts of the basket and cover, and may be stapled, nailed or otherwise affixed to the ends of the handle slat, as indicated at 14. This is a very cheap and effective manner of forming the retainers, but other means may be substituted therefor, if desired, so long as the abutting co-operation between same and the basket handles is retained in accordance with the invention.

It will be apparent to those familiar with basket covers of the general type referred to, that the handle slat provided with the retaining means of the invention is not and need not be as long as those ordinarily employed, because it cannot be accidentally disengaged from the basket handles by pressure exerted from within the basket. Thus not only is a saving in veneer stock made but the packed and covered basket does not have the slat ends projecting so far from its periphery as to interfere with handling, storing and shipping.

It will be apparent that covers provided with the retaining means of the invention may be applied to baskets in the same manner as covers of this general type have been applied heretofore, but they do not have to be wired, locked, tied or otherwise doubly secured, and the time and expense of such securing operations, and the cost of the securing means or devices are saved.

Obviously, when the cover is applied to a packed basket, as illustrated in Fig. 1, the greater the pressure against it from within the basket the tighter will the battens 13 hold against the reaches 5 of the basket handles. This action is well illustrated in Fig. 4. Of course downward pressure upon the ends of the handle slat 9 will release these ends and permit removal of the cover.

Various changes and modifications are considered as within the spirit of the invention and the scope of the following claims.

What I claim is:—

1. A cover for a basket of the type having loop members adjacent to its upper edge, said cover provided with means for retaining it upon the basket, including a slat for engagement with said loop members, said slat having an end overhanging the margin of the cover and adapted for extension through a loop member, and rigid means upstanding from the upper surface of said overhanging end and engageable with said loop member in such manner as to provide for disengagement between the loop member and the upstanding means by substantially vertical downward pressure upon said slat end.

2. A cover for a basket of the type having loop members adjacent to its upper edge, said cover provided with means for retaining it upon the basket, including a slat for engagement with said loop members, said slat having an end overhanging the margin of the cover and adapted for extension through a loop member, and means upstanding from the upper surface of said overhanging end and adapted for abutting contact with an outwardly facing portion of the loop member in such manner as to provide for disengagement between the loop member and the upstanding means by downward pressure exerted upon said slat end.

3. A cover for baskets of the type having looped handles adjacent to its upper edge, said cover provided with means for retaining it upon the basket, including a slat having its ends overhanging the margin of the cover and adapted for extension through said handles, and rigid means upstanding from the upper surface of said overhanging ends and engageable with said handles in such manner as to provide for disengagement between the handles and upstanding means by substantially vertical downward pressure upon said slat ends.

4. The combination with a basket having looped handles adjacent to its upper edge, of a cover provided with means for retaining it upon the basket, including a slat having its ends overhanging the margin of the cover and adapted for extension through said handles, and rigid means upstanding from the upper surface of said overhanging ends and engageable with said handles in such manner as to provide for disengagement between the handles and upstanding means by substantially vertical downward pressure upon said slat ends.

5. Retaining means for a cover for baskets of the type having loop members adjacent to its upper edge, including a slat for engagement with said loop members, said slat having an end overhanging the margin of the cover and adapted for extension through a loop member, and rigid means upstanding from the upper surface of said overhanging end and engageable with said loop member in such manner as to provide for disengagement between the loop member and the upstanding means by substantially vertical downward pressure upon said slat end.

6. A cover for baskets of the type having looped handles adjacent to its upper edge, said cover provided with means for retaining it upon the basket, including a slat having its ends overhanging the margin of the cover and adapted for extension through said handles, and battens upstanding from the upper surface of said overhanging ends and engageable with said handles in such manner as to provide for disengagement between the handles and battens by substantially vertical downward pressure exerted upon said slat ends.

WALTER E. MORGAN.